2,932,985

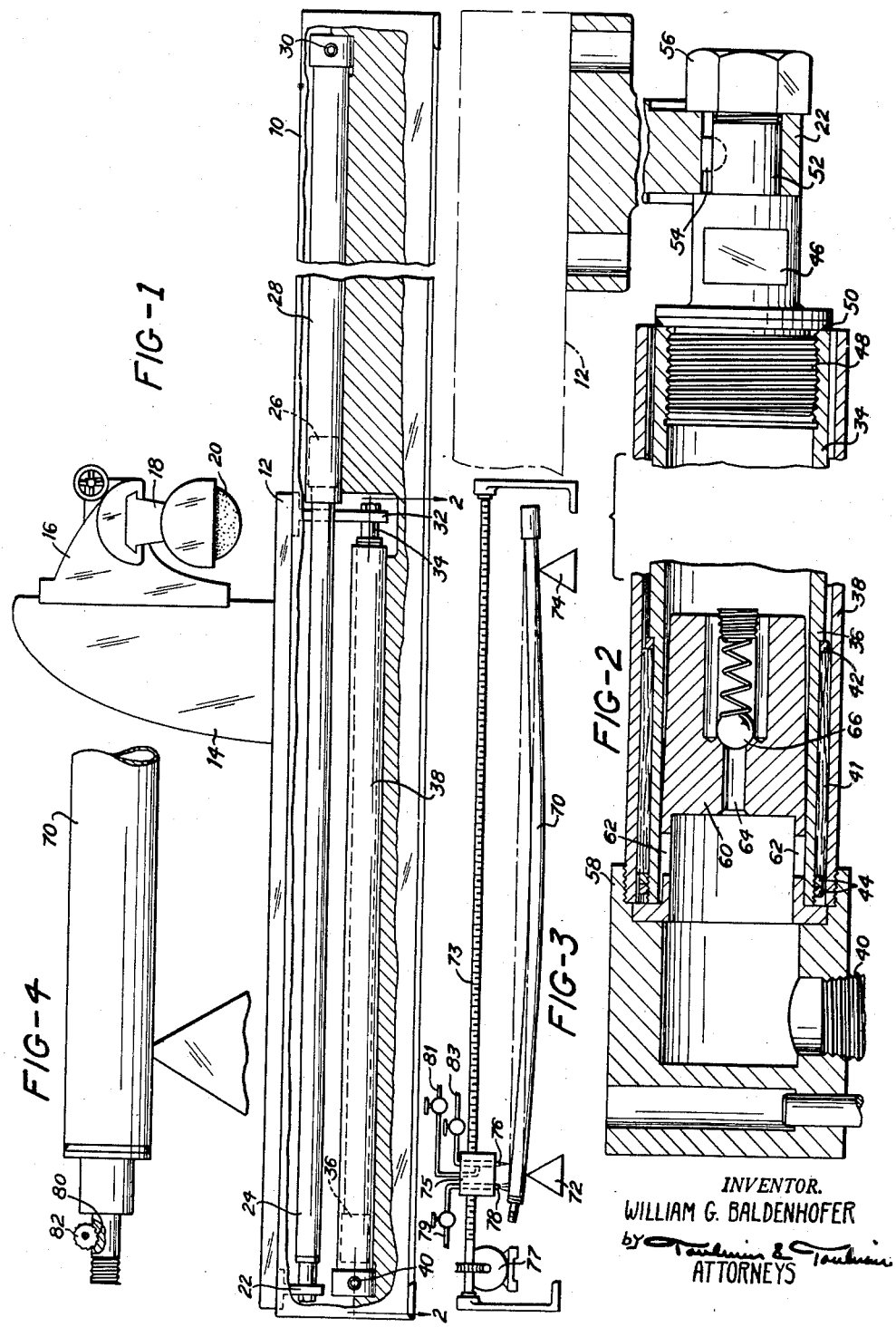
April 19, 1960     W. G. BALDENHOFER     2,932,985
LONG PISTON RODS AND MOTOR EMBODYING THE SAME
Original Filed Feb. 8, 1954
INVENTOR.
WILLIAM G. BALDENHOFER
ATTORNEYS United States Patent Office 2,932,985
Patented Apr. 19, 1960

LONG PISTON RODS AND MOTOR EMBODYING THE SAME

William G. Baldenhofer, Springfield, Ohio, assignor to The Thompson Grinder Company, Springfield, Ohio, a corporation of Ohio Original application February 8, 1954, Serial No. 408,903. Divided and this application March 19, 1956, Serial No. 572,301

1 Claim. (Cl. 74—579)

This invention relates to piston rods and like elongated members, particularly to extremely long piston rods and to motors having such rods, and the like, and is a division of my co-pending application, Serial No. 408,903, filed February 8, 1954, and now abandoned.

Many times it becomes necessary to employ an elongated rod as a tension or compression member in the manufacture of machine tools and similar devices, and in particular a machine tool having an extremely long table travel, where the table is driven by a hydraulic motor and an extremely long element must be employed in the form of a piston rod for connecting the table with the piston, by means of which it is actuated.

In the case of machine tools having extremely long table travels, it has been customary to drive the table by means of a rack and pinion because of the difficulty encountered in connection with the extremely long piston rods that would be required to replace the rack and pinion. The hydraulic actuation of a table is preferred because, with a rack and pinion, the speed of movement of the table will vary slightly as each tooth of the pinion meshes with the rack. In some instances this slight variation in speed is not important, but wherever a very finely finished surface is to be produced on the machine as, for example, when a finished grind is being taken on a surface these slight variations in speed will result in marks occurring on the surface being finished.

Heretofore, when machine tool tables were driven over long distances by hydraulic motors, the sagging of the piston rod between the ends thereof induced objectionable wear on the packing or the rod, or both thereof, and the rod would tend to whip when the direction of travel of the table was reversed.

The development of a packless cylinder minimized the objectionable feature of wearing of the piston packing when the rod was passed therethrough, but the objection still existed in that the rod would tend to whip and likewise the piston on the rod would tend to slightly cock in the cylinder, thus promoting objectionable wear on the cylinder and the piston packing.

Having the foregoing in mind, it is a particular object of the present invention to provide a piston rod which overcomes the drawbacks referred to above so that, by use of a rod according to this invention, a machine tool table can be driven over as long a distance of travel as is necessary without rod sag becoming objectionable.

A still further object of the present invention is the provision of a hydraulic motor assembly for driving the table for a machine tool or the like, in which there is no objectionable sagging of the piston rod in any position thereof in the hydraulic cylinder of the motor.

Another particular object of this invention is the provision of a hydraulic motor arrangement for driving a machine tool table or the like, in which the objectionable features of whipping or yielding of the piston rod of the hydraulic motor is eliminated.

These and other objects and advantages of this invention will become more apparent upon reference to the following specification taken in connection with the accompanying drawings, in which:

Figure 1 is a view of a grinding machine having a long bed, and with the bed in section to show the hydraulic motors which actuate the table;

Figure 2 is a sectional view showing the internal construction of one of the motors of Figure 1 and is indicated by line 2—2 on Figure 1;

Figure 3 is a more or less diagrammatic view showing the piston rod being treated according to this invention; and Figure 4 is a fragmentary view showing a key way being cut in the rod after its treatment in order to orient the rod with the bracket which connects it with the table in the machine.

Referring to the drawings somewhat more in detail, the machine illustrated in Figure 1 comprises a bed 10 on which there is reciprocably mounted a table 12. By way of example of a machine tool of the size adapted to benefit by the application of the present invention, bed 10 may be on the order of about 48 feet long and table 12 on the order of about 20 to 25 feet long, with the stroke of the table being on the order of 25 feet.

Adjacent bed 10 is a column 14 and mounted for vertical reciprocation thereon is a saddle 16 that carries a wheel head unit 18 having a motor-driven grinding wheel 20 adapted for being brought into grinding relation with work on table 12.

For driving table 12, there is provided a bracket 22 at one end which is connected with a piston rod 24 that extends substantially the length of the table and terminates in a piston 26 reciprocable in cylinder 28 that is adapted for being supplied with pressure fluid via conduit 30.

Table 12 has a similar bracket 32 at its opposite end connected to piston rod 34 having piston 36 located in the cylinder 38 in the bed, and which cylinder is provided with conduit 40 for supplying pressure fluid thereto.

In Figure 2 it will be seen that the cylinders of the hydraulic motors—the lefthand motor being illustrated in Figure 2—are without packing and that, instead, the piston 36 on the end of the piston rod 34 consists of the packing material 41 compressed between the ring 42 on the piston rod and the gland nuts 44 threaded on the extreme end of the rod.

It will also be seen in Figure 2 that the piston rods are hollow, thus taking the form of tubes, and that at the bracket end of the rod it is provided with a closure member 46 threaded at 48 into the end of the rod and welded thereto as at 50. The closure member 46 comprises a part 52 keyed to bracket 22 by key 54 and clamped thereto by nut 56.

The left end of cylinder 38 is threaded into support block 58, to which conduit 40 is connected and carried by the support block, and clamped thereto by cylinder 38 is a member 60 having the radially open ports 62 and the axial passage 64. Check valve 66 closes passage 64 against flow therethrough in the leftward direction while permitting flow therethrough in the rightward direction.

Member 60 tapers inwardly somewhat toward the right and, at its left end in the region of ports 62, is a fairly close fit within rod 34.

The described arrangement provides for free flow of actuating fluid rightwardly through passage 64 into the interior of rod 34, whereby the pressure will drive the rod and the connected parts rightwardly; whereas, when the rod is driven leftwardly by movement of the table 12 in the opposite direction, the fluid that is expelled from the interior of the rod must pass through the ports 62, and when flow to these ports commences to be restricted by the member 60 entering the left end of rod 34 a damping and shock-absorbing effect is had on table 12 that will cushion it to a halt so that it can be reversed without shock.

As mentioned previously, a rod as long as is required in a motor of the type described will sag between its opposite ends. I have discovered, however, that a rod of this nature can be constructed so that it does not sag any appreciable amount when supported at its opposite ends by treating it according to the diagrammatic illustration in Figure 3.

In Figure 3 the rod is indicated at 70 and is supported on the spaced brackets 72 and 74 located apart approximately the same distance that the points of support of the rod will be when fully extended in use. In Figure 3, the actual sag of the rod has been considerably exaggerated, but it will be appreciated that for a rod of, say 25 feet in length, the sag could approach one-fourth of an inch at the center.

According to the present invention the rod is drawn up for a substantially horizontal position by applying heat to the top fibers thereof by means of a small torch as at 76, which advantageously is an acetylene torch, which preferably is adjusted so as to have a non-oxidizing flame. This torch is moved lengthwise of the rod, and the application of localized heat to the compressed fibers along the top of the rod will cause expansion thereof so that the rod is brought up to where it extends substantially straight between the supports 72 and 74. The degree of heat so applied will vary and, while no accurate measurement has been made of the temperature that the rod reaches during this treatment, it has been noted that the rod does not reach red heat and that, even with a polished rod, the polish does not discolor after the stressing treatment according to this invention.

Preferably, the torch 76 is followed by a quenching head 78 which supplies a small stream of cooling water to the rod to bring it back to room temperature. This chilling of the rod, after heating thereof, apparently sets the fibers of the rod so that it remains in horizontal position after the heat has been removed therefrom.

It will be apparent that inasmuch as piston rods of this nature will vary considerably as to their stroke, some being tubular as illustrated in this application, they will vary considerably in diameter and, as to the degree of sag that must be counteracted and the exact temperature at which the rod will be raised and the length of time it must be maintained at that temperature, will vary somewhat and thus no specific limits are intended to be implied by stating that the rod referred to was not elevated to red heat and that the torch is moving relatively slowly therealong.

In Figure 3 the apparatus for treating the rod is illustrated diagrammatically with screw 73 supporting block 75 that carries torch 76 and quenching head 78. Motor 77 drives the screw to move the block along the rod at a predetermined rate. Valved conduit 79 supplies a cooling medium to quenching head 78 while valved conduits 81 and 83 supply fuel and an oxidizer therefor in the proper proportion to torch 76.

It will be appreciated that all of these features will vary with all the particular results which it is desired to accomplish.

Following the treatment as described above, it becomes important to locate the rod in the machine so that the stressed side is upwardly, and with this in mind I cut a key way 80 in the rod by cutter 82 which is oriented relative to the stressed side of the rod so that when the rod is keyed to the attached bracket therefor the stressed side of the rod will be located at the proper position.

It will be understood that this invention is susceptible to modification in order to adapt it to different usages and conditions and, accordingly, it is desired to comprehend such modifications within this invention as may fall within the scope of the appended claim.

I claim:

In a piston and cylinder mechanism, an elongated piston rod having a length and weight which normally would produce an objectionable downward weight deflection when supported at its ends in a substantially horizontal position, said elongated piston rod having the uppermost longitudinally extended surface portion pre-stressed permanently by the application of a high temperature flame followed by quenching being pre-stressed only longitudinally along said uppermost surface of the rod to cause said rod to be bowed upwardly, and wherein the rod will be substantially straight without sagging when the same is supported at its opposite ends and the pre-stressed portion of the rod is positioned uppermost.

References Cited in the file of this patent

UNITED STATES PATENTS

| | | |
|---|---|---|
| 700,404 | Braden | May 20, 1902 |
| 845,827 | Steedman | Mar. 5, 1907 |
| 1,118,297 | McElroy | Nov. 24, 1914 |
| 2,156,005 | Williams | Apr. 25, 1939 |
| 2,293,167 | Overbeke | Aug. 18, 1942 |
| 2,299,123 | Balsiger | Oct. 20, 1942 |
| 2,363,142 | Reed | Nov. 21, 1944 |
| 2,550,925 | Weimar | May 1, 1951 |
| 2,740,381 | Dugle | Apr. 3, 1956 |